(12) United States Patent
Sone et al.

(10) Patent No.: US 7,294,680 B2
(45) Date of Patent: Nov. 13, 2007

(54) METHOD OF PRODUCING CONJUGATED DIENE POLYMERS WITH NARROW MOLECULAR WEIGHT DISTRIBUTION AND POLYMER PRODUCED

(75) Inventors: Takuo Sone, Tokyo (JP); Katsutoshi Nonaka, Tokyo (JP); Iwakazu Hattori, Tokyo (JP); Akio Takashima, Tokyo (JP)

(73) Assignee: JSR Corporation, Tokyo (JP)

( * ) Notice: Subject to any disclaimer, the term of this patent is extended or adjusted under 35 U.S.C. 154(b) by 59 days.

(21) Appl. No.: 10/759,299

(22) Filed: Jan. 20, 2004

(65) Prior Publication Data

US 2004/0147694 A1    Jul. 29, 2004

Related U.S. Application Data

(63) Continuation of application No. 09/033,685, filed on Mar. 3, 1998, now abandoned.

(30) Foreign Application Priority Data

Mar. 5, 1997  (JP) ..................................... 9-65607
Jul. 15, 1997  (JP) ................................... 9-203932

(51) Int. Cl.
  *C08F 4/52*    (2006.01)
  *C08F 8/42*    (2006.01)
  *C08F 136/02*  (2006.01)
  *C08F 236/02*  (2006.01)
(52) U.S. Cl. ..................... 526/340.4; 526/90; 526/113; 526/127; 526/128; 526/129; 526/144; 526/213; 526/216
(58) Field of Classification Search ............. 526/340.4, 526/90, 113, 127, 128, 129, 144, 213, 216
   See application file for complete search history.

(56) References Cited

FOREIGN PATENT DOCUMENTS

| EP | 0267675 |   | 5/1988 |
| JP | 4-154819 |   | 5/1992 |
| JP | 05051406 | * | 3/1993 |
| JP | 05059103 | * | 3/1993 |
| JP | 08/073515 |   | 3/1996 |
| JP | 08073515 | * | 3/1996 |
| WO | WO 93/05083 |   | 3/1993 |

OTHER PUBLICATIONS

Database WPI, Section CH, Week 9621, Derwent Publications, Ltd., AN96-205547 XP002068604 Abstract of JP08/07313, Mar. 19, 1996, Ube Ind. Ltd.
Patent Abstracts of Japan, vol. 017, No. 373, Jul. 14, 1993, Abstract of JP05/059103 (Mar. 9, 1993) Asahi Chem Ind. Co. Ltd.
Patent Abstracts of Japan, vol. 017, No. 361, Jul. 8, 1993, Abstract of JP05/051406 (Mar. 2, 1993) Asahi Chem Ind. Co. Ltd.

* cited by examiner

*Primary Examiner*—Kelechi C. Egwim
(74) *Attorney, Agent, or Firm*—Sughrue Mion Pllc.

(57) ABSTRACT

Conjugated diene polymers having good wear resistance, mechanical properties, storage stability, processability and a reduced cold flow are produced by polymerizing a conjugated diene compound with a catalyst of rare earth element compound, a compound containing at least one halogen atom, an aluminoxane, and an organoaluminum compound in an organic solvent and reacting the resulting polymer just after the polymerization with at least one compound selected from the group consisting of a halogenated organometallic compound, a halogenated metal compound, an organometallic compound, a heterocumulene compound, a hetero three-membered-ring containing compound, a halogenated isocyano compound, a carboxylic acid, an acid halide, an ester compound, a carbonic ester compound, an acid anhydride and a metal salt of a carboxylic acid as a modifying agent.

14 Claims, No Drawings

METHOD OF PRODUCING CONJUGATED DIENE POLYMERS WITH NARROW MOLECULAR WEIGHT DISTRIBUTION AND POLYMER PRODUCED

This application is a continuation of application Ser. No. 09/033,685 filed Mar. 3, 1998 now abandoned, the disclosure of which is incorporated herein by reference.

BACKGROUND OF THE INVENTION

1. Field of the Invention

This invention relates to a method of producing a novel conjugated diene polymer having excellent wear resistance and mechanical properties and a reduced cold flow by polymerizing a conjugated diene compound with a catalyst of rare earth element compound and reacting the resulting polymer just after the polymerization with at least one compound selected from the group consisting of a halogenated organometallic compound, a halogenated metal compound, an organometallic compound, a heterocumulene compound, a hetero three-membered-ring containing compound, a halogenated isocyano compound, a carboxylic acid, an acid halide, an ester compound, a carbonic ester compound, an acid anhydride and a metal salt of a carboxylic acid as a modifying agent.

2. Description of Related Art

Since conjugated diene polymers play an industrially very important role, there have hitherto been proposed many proposals on a polymerization catalyst for a conjugated diene compound in the production of the conjugated diene polymer. Particularly, many polymerization catalysts giving a high content of cis-1,4-bond have been studied and developed for providing conjugated diene polymers having high performances in the thermal and mechanical properties. For example, there are well-known composite catalyst systems containing a compound of a transition metal such as nickel, cobalt, titanium or the like as an essential component. Among them, some catalysts have industrially and widely been used as a polymerization catalyst of butadiene, isoprene or the like (see End. Ing. Chem., 48, 784(1956) and JP-B-37-8198).

On the other hand, a composite catalyst system comprising a rare earth metal compound and an organometallic compound of an element of Group I-III has been studied and developed in order to attain a further higher content of cis-1,4-bond and an excellent polymerization reactivity, and also studies on a high stereospecific polymerization using the same have been actively conducted (see Makromol. Chem. Suppl., 4, 61(1981), J. Polym. Sci, Polym. Chem. Ed., 18, 3345(1980), a specification of German Patent Application No. 2,848,964, Sci, Sinica., 2/3, 734(1980) and Rubber Chem. Technol., 58, 117(1985)).

Among these catalyst systems, a composite catalyst consisting essentially of a neodymium compound and an organoaluminum compound has been confirmed to provide a high cis-1,4-bond content and an excellent polymerization reactivity and has already been industrialized as a polymerization catalyst for butadiene or the like (see Macromolecules, 15, 230(1982) and Makromol. Chem., 94, 119(1981)).

However, a commercial demand on polymers becomes higher with the advance of recent industrial technique and also it is strongly demanded to develop polymer materials having higher wear resistance, mechanical properties and thermal properties (thermal stability and the like).

As an effective means for solving the above problem, there are actively conducted research activities on a polymerization method exhibiting a high polymerization reactivity toward a conjugated diene compound and capable of providing a narrow molecular weight distribution to the resulting polymer.

For example, it is known to increase the polymerization reactivity when using a two-component system consisting of a neodymium compound and methylaluminoxane (see Polymer Communication, 32, No. 17, p514(1991)). Furthermore, it is reported that a conjugated diene polymer having a narrow molecular weight distribution is obtained under a high polymerization reactivity when using a catalyst system produced by adding an organoaluminum compound and/or a Lewis acid to the system of neodymium compound and aluminoxane (see JP-A-6-211916, JP-A-6-306113 and JP-A-8-73515). However, the polymers obtained by the above polymerization methods are generally straight-chain polymers being less in the branched structure, so that they may have a problem on the mixing property or processability with a polymer material such as rubber, or various fillers in accordance with applications, and are large in the cold flow to cause troubles in the storing and transportation.

In JP-A-63-178102, JP-A-63-297403, JP-A-63-305101, JP-A-5-51406 and JP-A-5-59103 are reported polymers having improved processability obtained by polymerizing a conjugated diene compound in a catalyst system consisting of a neodymium compound and an organoaluminum compound and then reacting with a specified compound as a coupling agent. However, the polymerization reactivity in such a catalyst system is not sufficiently satisfied.

SUMMARY OF THE INVENTION

The inventors have made various studies and found a method of producing conjugated diene polymers wherein a conjugated diene compound such as butadiene or the like can be polymerized with a high reactivity by using a catalyst system of a rare earth element compound and an aluminoxane and further reacting the resulting polymer just after the polymerization with a specified halide, heterocumulene compound, hetero three-membered-ring containing compound, carboxylic acid, ester compound, carboxylic ester compound, acid anhydride, metal salt of carboxylic acid or the like as a modifying agent to produce a conjugated diene polymer having improved wear resistance, mechanical properties and reduced cold flow, and as a result the invention has been accomplished.

According to the invention, there is the provision of a method of producing a conjugated diene polymer which comprises polymerizing a conjugated diene compound with a catalyst consisting essentially of the following components (a) to (d) in an organic hydrocarbon solvent; and then reacting the resulting polymer with at least one compound selected from the group consisting of the following components (e) to (j).

Component (a): a compound containing a rare earth element of atomic number 57-71 in the Periodic Table or a compound obtained by reacting the compound with a Lewis base;

Component (b): a compound containing at least one halogen atom;

Component (c): an aluminoxane;

Component (d): an organoaluminum compound represented by the following general formula (1):

$$AlR^1R^2R^3 \qquad (1)$$

(wherein $R^1$ and $R^2$ are the same or different and are a hydrocarbon group having a carbon number of 1-10 or a hydrogen atom, and $R^3$ is a hydrocarbon group having a carbon number of 1-10 provided that $R^3$ is the same as or different from $R^1$ or $R^2$);

Component (e): a halogenated organometallic compound, a halogenated metal compound or an organometallic compound represented by the following general formula (2), (3), (4) or (5):

$$R^4{}_nM'X_{4-n} \quad (2)$$

$$M'X_4 \quad (3)$$

$$M'X_3 \quad (4)$$

$$R^4{}_nM'(-R^5-COOR^6)_{4-n} \quad (5)$$

(wherein $R^4$ and $R^5$ are the same or different and are a hydrocarbon group having a carbon number of 1-20, $R^6$ is a hydrocarbon group having a carbon number of 1-20 and may contain an ester group in its side chain, M' is a tin atom, a silicon atom, a germanium atom or a phosphorus atom, X is a halogen atom, and n is an integer of 0-3);

Component (f): a heterocumulene compound having a chemical structure of the following general formula (6):

$$Y=C=Z \quad (6)$$

(wherein Y is a carbon atom, an oxygen atom, a nitrogen atom or a sulfur atom, and Z is an oxygen atom, a nitrogen atom or a sulfur atom);

Component (g): a hetero three-membered-ring containing compound having a chemical structure of the following general formula (7):

(7)

(wherein Y' is an oxygen atom, a nitrogen atom or a sulfur atom);

Component (h): a halogenated isocyano compound;

Component (i): a carboxylic acid, and acid halide, an ester compound, a carboxylic ester compound or an acid anhydride represented by the following general formula (8), (9), (10), (11), (12) or (13):

$$R^7-(COOH)_m \quad (8)$$

$$R^8-(COX)_m \quad (9)$$

$$R^9-(COO-R^{10}) \quad (10)$$

$$R^{11}-OCOO-R^{12} \quad (11)$$

$$R^{13}-(COOCO-R^{14})_m \quad (12)$$

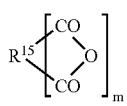

(13)

(wherein $R^7$ to $R^{15}$ are the same or different and are a hydrocarbon group having a carbon number of 1-50, X is a halogen atom and m is an integer of 1-5);

Component (j): a metal salt of a carboxylic acid represented by the following general formula (14), (15) or (16):

$$R^{16}{}_lM''(OCOR^{17})_{4-l}, \quad (14)$$

$$R^{18}{}_lM''(OCO-R^{19}-COOR^{20})_{4-l} \quad (15)$$

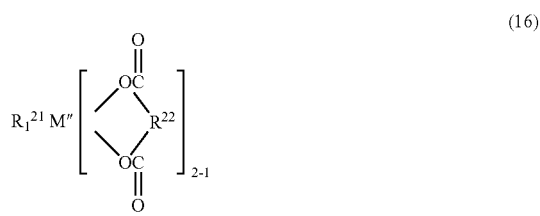

(16)

(wherein $R^{16}$ to $R^{22}$ are the same or different and are a hydrocarbon group having a carbon number of 1-20, M'' is a tin atom, a silicon atom or a germanium atom, and l is an integer of 0-3).

DESCRIPTION OF PREFERRED EMBODIMENTS

The component (a) used in the catalyst according to the invention is a compound containing a rare earth element of atomic number 57-71 in the Periodic Table or a compound obtained by reacting the compound with a Lewis base. As the rare earth element, neodymium, praseodymium, cerium, lanthanum, gadolinium and the like or a mixture thereof are preferable, and neodymium is more favorable.

The rare earth element containing compound according to the invention is a carboxylate, an alkoxide, a β-diketone complex, a phosphate or a phosphite. Among them, a carboxylate and a phosphate are preferable, and a carboxylate is more favorable.

The carboxylate of rare earth element is represented by the following general formula (17):

$$(R^{23}-CO_2)_3M \quad (17)$$

(wherein M is a rare earth element of atomic number 57-71 in the Periodic Table, and $R^{23}$ is a hydrocarbon group having a carbon number of 1-20, preferably a saturated or unsaturated alkyl group and is a straight chain or a branched chain or a ring and carboxyl group is bonded to a primary, secondary or tertiary carbon atom thereof).

As the carboxylic acid, mention may be made of octanoic acid, 2-ethyl-hexanoic acid, oleic acid, stearic acid, benzoic acid, napthenic acid, versatic acid (trade name made by Shell Chemical Corporation, a carboxylic acid in which carboxyl group is bonded to a tertiary carbon atom) and the like. Among them, 2-ethyl-hexanoic acid, napthenic acid and versatic acid are preferable.

The alkoxide of rare earth element has the following general formula (18):

$$(R^{24}O)_3M \quad (18)$$

(wherein M is a rare earth element of atomic number 57-71 in the Periodic Table). As an example of the alkoxy group represented by $R^{24}O$, mention may be made of 2-ethyl-hexylalkoxy group, oleylalkoxy group, stearylalkoxy group, phenoxy group, benzylalkoxy group and the like. Among them, 2-ethyl-hexylalkoxy group and benzylalkoxy group are preferable.

As the β-diketone complex of rare earth element, mention may be made of acetylacetone complex, benzoylacetone complex, propionitrile acetone complex, valerylacetone complex, ethylacetylacetone complex and the like. Among them, acetylacetone complex and ethylacetylacetone complex are preferable.

As the phosphate or phosphite of rare earth element, mention may be made of bis(2-ethylhexyl) phosphate, bis (1-methylheptyl) phosphate, bis(p-nonylphenyl) phosphate, bis(polyethylene glycol-p-nonylphenyl) phosphate, (1-methylheptyl)(2-ethylhexyl) phosphate, (2-ethylhexyl)(p-nonylphenyl) phosphate, mono-2-ethylhexyl-2-ethylhexyl phosphonate, mono-p-nonylphenyl-2-ethylhexyl phosphonate, bis(2-ethylhexyl) phosphite, bis(1-methylheptyl) phosphite, bis(p-nonylphenyl) phosphite, (1-methylheptyl)(2-ethylhexyl) phosphite, (2-ethylhexyl)(p-nonylphenyl) phosphite and the like of the rare earth element. Among them, bis(2-ethylhexyl) phosphate, bis(1-methylheptyl) phosphate, mono-2-ethylhexyl-2-ethylhexyl phosphonate and bis(2-ethylhexyl) phosphite are favorable.

Among the above compounds, phosphates of neodymium and carboxylates of neodymium are preferable, and carboxylates of neodymium such as neodymium 2-ethyl-hexanoate, neodymium versatate and the like are most preferable as the rare earth element compound.

Lewis base is used for easily solubilizing the rare earth element compound in a solvent or stably storing the rare earth element compound over a long time of period. In this case, Lewis base is mixed with the rare earth element compound at a molar ratio of 0-30 mole, preferably 1-10 mole per 1 mole of the rare earth element compound, or Lewis base and the rare earth element compound are used as a product obtained by previously reacting both compounds.

As Lewis base, mention may be made of acetyl-accetone, tetrahydrofuran, pyridine, N,N-dimethylformamide, thiophene, diphenyl ether, triethylamine, an organophosphorus compound, and a monovalent or bivalent alcohol.

The component (b) used in the catalyst according to the invention is a halogen compound containing a metal of Group II, III, IV, V, VI, VII or VIII in the Periodic Table. Preferably, it includes a metal halide, an organometallic halide, an organic halide compound and a halogenated silicon compound. As the halogen atom, a chlorine atom or a bromine atom is preferable.

As the metal halide and the organometallic halide, mention may be made of ethylmagnesium chloride, ethylmagnesium bromide, n-propylmagnesium chloride, n-propylmagnesium bromide, isopropylmagnesium chloride, isopropylmagnesium bromide, n-butylmagnesium chloride, n-butylmagnesium bromide, t-butylmagnesium chloride, t-butylmagnesium bromide, phenylmagnesium chloride, phenylmagnesium bromide, methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, dibutyltin dichloride, aluminum tribrommide, antimony trichloride, antimony pentachloride, phosphorus trichloride, phosphorus pentachloride, tin tetrachloride, titanium tetrachloride, tungsten hexachloride, manganese chloride, rhenium chloride and the like. Among them, diethylaluminum chloride, ethylaluminum sesquichloride, ethylaluminum dichloride, diethylaluminum bromide, ethylaluminum sesquibromide, ethylaluminum dibromide and the like are preferable.

The organic halide compound is a compound having a high reactivity with base and concretely includes organic chlorine compounds such as benzoyl chloride, xylene dichloride, xylene dibromide, propyonyl chloride, benzyl chloride, benzylidene chloride, t-butyl chloride and the like; organic bromine compounds such as benzoyl bromide, propyonyl bromide, benzyl bromide, benzylidene bromide, t-butyl bromide and the like; methylchloroformate, methylbromoformate, chlorodiphenyl methane, chlorotriphenyl methane and so on.

As the halogenated silicon compound, mention may be made of silicon tetrachloride, silicon tetrabromide, silicon tetraiodide, hexachloro disilane and the like. As the halogenated organosilicon compound, mention may be made of triphenylchlorosilane, trihexylchlorosilane, trioctylchlorosilane, tributylchlorosilane, triethylchlorosilane, trimethylchlorosilane, methylchlorosilane, trimethylbromosilane, diphenyl dichlorosilane, dihexyl dichlorosilane, dioctyl dichlorosilane, dibutyl dichlorosilane, diethyl dichlorosilane, dimethyl dichlorosilane, methyldichlorosilane, phenyltrichlorosilane, hexyltrichlorosilane, octyltrichlorosilane, butyltrichlorosilane, methyltrichlorosilane, ethyltrichlorosilane, vinyltrichlorosilane, trichlorosilane, tribromosilane, vinylmethyl dichlorosilane, vinyldimethylchlorosilane, chloromethylsilane, chloromethyl trimethylsilane, chloromethyl dimethylchlorosilane, chloromethylmethyl dichlorosilane, chloromethyl trichlorosilane, dichloromethylsilane, dichloromethyl methyldichlorosilane, dichloromethyl dimethylchlorosilane, dichlorotetramethyl disilane, tetrachlorodimethyl disilane, bis(chlorodimethyl) silylethane, dichlorotetramethyl disiloxane, trimethylsiloxy dichlorosilane, trimethylsiloxy dimethyl chlorosilane, tristrimethylsiloxy dichlorosilane and the like. Among them, silicon tetrachloride, trieythylchlorosilane, trimethylchlorosilane, diethyl dichlorosilane, dimethyl dichlorosilane, methyl dichlorosilane, ethyl trichlorosilane, methyl trichlorosilane, trichlorosilane, dichlorotetramethyl disilane and dichlorotetramethyl disiloxane are favorable. More particularly, trimethylchlorosilane, methyldichlorosilane, diethyldichlorosilane, methyltrichlorosilane, ethyltrichlorosilane, trichlorosilane, dichlorotetramethyl disilane, dichlorotetramethyl disiloxane and silicon tetrachloride are preferable.

As the component (b), diethylaluminum chloride, ethylaluminum sesquichloride, ethylaluminum dichloride, trimethylchlorosilane, silicon tetrachloride, dimethyldichlorosilane, methyldichlorosilane, diethyldichlorosilane and trimethylchlorosilane are preferable among the aforementioned compounds, and trimethylchlorosilane, silicon tetrachloride, dimethyldichlorosilane, methyldichlorosilane, diethyldichlorosilane or trimethylchlorosilane is most preferable.

The component (c) used in the catalyst according to the invention is an aluminoxane having a chemical structure shown by the following formula (19) or (20):

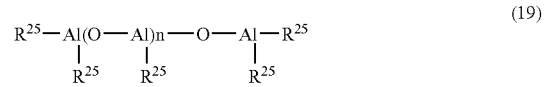

(19)

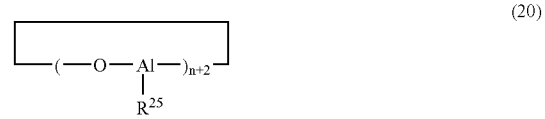

(20)

(wherein $R^{25}$ is a hydrocarbon group in a carbon number of 1-20, and n is an integer of not less than 2).

In the aluminoxane represented by the formula (19) or (20), the hydrocarbon group represented by $R^{25}$ includes methyl group, ethyl group, propyl group, n-butyl group, isobutyl group, t-butyl group, hexyl group, isohexyl group, octyl group, isooctyl group and the like. Among them, methyl group, ethyl group, isobutyl group and t-butyl group are preferable, and methyl group is most preferable. And also, n is an integer of not less than 2, preferably not less than 5, more particularly 10-100.

As the aluminoxane, mention may be made of methylaluminoxane, ethylaluminoxane, n-propylaluminoxane, n-butylaluminoxane, isobutylaluminoxane and the like.

The production of the aluminoxane may-be carried out by any well-known techniques. For example, an aluminoxane can be produced by adding trialkylaluminum or dialkylaluminum monochloride to an organic solvent such as benzene, toluene, xylene or the like and then adding and reacting water or a salt having water of crystallization such as copper sulfate pentahydrate, aluminum sulfate hexadecahydrate or the like thereto.

The component (d) used in the catalyst according to the invention is an organoaluminum compound represented by the general formula (1) of $AlR^1R^2R^3$ (wherein $R^1$ and $R^2$ are the same or different and are a hydrocarbon group having a carbon number of 1-10 or a hydrogen atom, and $R^3$ is a hydrocarbon group having a carbon number of 1-10 provided that $R^3$ is the same as or different from $R^1$ or $R^2$), which includes, for example, trimethylaluminum, triethylaluminum, tri-n-propylaluminum, tri-isopropylaluminum, tri-n-butylaluminum, tri-isobutylaluminum, tri-t-butylaluminum, tripentylaluminum, trihexylaluminum, tricyclohexylaluminum, trioctylaluminum, diethylaluminum hydride, di-n-propylaluminum hydride, di-n-butylaluminum hydride, di-isobutylaluminum hydride, dihexylaluminum hydride, di-isohexylaluminum hydride, dioctylaluminum hydride, di-isooctylaluminum hydride, ethylaluminum dihydride, n-propylaluminum dihydride, isobutylaluminum dihydride and the like. Among them, triethylaluminum, tri-isobutylaluminum, diethylaluminum hydride and di-isobutylaluminum hydride are preferable.

As the component (d) according to the invention, the above organoaluminum compounds may be used alone or in a combination of two or more compounds.

The amount of each component or composition ratio in the catalyst according to the invention is set to a given value in accordance with the use purpose or necessity.

In this connection, the component (a) is preferable to be used in an amount of 0.0001-1.0 mmol per 100 g of the conjugated diene compound. When the amount is less than 0.0001 mmol, the polymerization reactivity undesirably lowers, while when it exceeds 1.0 mmol, the catalyst concentration becomes undesirably high and the step of removing ash is required. Preferably, the component (a) is used in an amount of 0.0005-1.0 mmol.

Further, a molar ratio of component (a) to component (b) is 1:0.1-1:15, preferably 1:0.5-1:5. And also, the amount of the component (c) used can be represented by a molar ratio of Al to the component (a), so that the molar ratio of component (a) to component (c) is 1:1-1:5,000, preferably 1:3-1:1,000. Furthermore, a molar ratio of component (a) to component (d) is 1:1-1:500, preferably 1:10-1:300 Moreover, a molar ratio of component (c) to component (d) is 1:0.02-1:300, preferably 1:0.05-1:250. If the component amount or molar ratio of the components is outside the above defined range, the resulting catalyst does not act as a high activity catalyst or the step of removing a catalyst residue is undesirably required.

In addition to the above components (a) to (d), a conjugated diene compound and/or a non-conjugated diene compound may be added in an amount of 0-50 mol per 1 mol of the component (a) as another catalyst component, if necessary. As the conjugated diene compound used in the production of the catalyst, use may be made of the same compound as the polymerization monomer such as 1,3-butadiene, isoprene and the like. As the non-conjugated diene compound, mention may be made of divinylbenzene, diisopropenyl benzene, triisopropenyl benzene, 1,4-vinylhexadiene, ethylidene norbornene and the like. The conjugated diene compound as a catalyst component is not essential, but provides a merit of further improving the catalytic activity when it is used together with the components (a)-(d).

The catalyst according to the invention is produced, for example, by reacting the components (a)-(d) dissolved in a solvent or further with the conjugated diene compound and/or non-conjugated diene compound, if necessary. In this case, the addition order of these components is optional. It is favorable that these components are previously mixed and reacted and then aged from a viewpoint of the improvement of polymerization reactivity and the shortening of polymerization induction period. The aging temperature is 0-100° C., preferably 20-80° C. When the temperature is lower than 0° C., the sufficient aging may not be conducted, while when it exceeds 100° C., the catalytic activity lowers and the broadening of molecular weight distribution may undesirably be caused. The aging time is not particularly restricted, but is usually not less than 0.5 minute. The aging may be conducted by contacting the components with each other in a line before the addition to a polymerization reaction vessel and is stable over several days.

In the invention, the conjugated diene compound(s) is polymerized with the catalyst consisting essentially of the above components (a)-(d) in an organic hydrocarbon solvent.

As the conjugated diene compound polymerizable by the catalyst according to the invention, mention may be made of 1,3-butadiene, 2-methyl-1,3-butadiene (or isoprene), 2,3-dimethyl-1,3-butadiene, 1,3-pentadiene, 1,3-hexadiene, cyclo 1,3-hexadiene and the like. Among them, 1,3-butadiene and isoprene are favorable. These conjugated diene compounds may be used alone or in a combination of two or more compounds. A copolymer is obtained when using a mixture of these compounds.

The solvent for the polymerization is an inert organic solvent, which includes, for example, a saturated aliphatic hydrocarbon such as butane, pentane, hexane, heptane or the like; a saturated alicyclic hydrocarbon such as cyclopentane, cyclohexane or the like; a monoolefin such as 1-butene, 2-butene or the like; an aromatic hydrocarbon such as benzene, toluene, xylene or the like; and a halogenated hydrocarbon such as methylene chloride, chloroform, carbon tetrachloride, trichloroethylene, perchloroethylene, 1,2-dichloroethane, chlorobenzene, bromobenzene, chlorotoluene or the like.

The polymerization temperature is usually −30° C.-+150° C., preferably 0-100° C. The polymerization reaction may be batch type or continuous type.

Moreover, the concentration of the conjugated diene compound as a monomer in the solvent is usually 5-50% by weight, preferably 7-35% by weight.

In order to avoid the deactivation of the catalyst according to the invention and the resulting polymer in the production of the final polymer, it is necessary to prevent the incorporation of a compound having a deactivation action such as oxygen, water, carbon dioxide gas or the like into the polymerization system as far as possible.

According to the invention, a conjugated diene polymer having a high content of cis-1,4-bond and a sharp molecular weight distribution can be obtained because the specified catalyst is used.

The conjugated diene polymer obtained by using the catalyst consisting essentially of the components (a)-(d) before modification (hereinafter referred to as an unmodified polymer) has a cis-1,4-bond content of not less than 90% and a Mw (weight-average molecular weight)/Mn (number-average molecular weight) ratio of not more than 4 as measured by a gel permeation chromatography.

When the cis-1,4-bond content in the unmodified polymer is less than 90%, the wear resistance becomes poor. Preferably, the cis-1,4-bond content is not less than 93%. The adjustment of the cis-1,4-bond content can easily be carried out by properly controlling the polymerization temperature.

When the Mw/Mn ratio in the unmodified polymer exceeds 4, the wear resistance becomes poor. Preferably, the Mw/Mn ratio is not more than 3.5, more particularly not more than 3.0. The adjustment of the Mw/Mn ratio can easily be carried out by properly controlling the molar ratio of the components (a)-(d).

In the invention, a novel conjugated diene polymer having an increased molecular weight or a branched polymer chain is formed by polymerizing the conjugated diene compound(s) with the above catalyst containing the rare earth element compound in the inert organic solvent to form an unmodified polymer and then adding at least one compound having a specified functional group (selected from the group consisting of the components (e)-(j) as previously mentioned) as a modifying agent to react (or modify) an active terminal of the unmodified polymer with the specified functional group. By such a modification are improved the wear resistance, mechanical properties and cold flow of the polymer.

The component (e) to be reacted with the active terminal of the unmodified polymer is a halogenated organometallic compound or a halogenated metal compound represented by the following formula (2), (3) or (4):

$$R^4{}_n M'X_{4-n} \quad (2)$$

$$M'X_4 \quad (3)$$

$$M'X_3 \quad (4)$$

(wherein $R^4$ is a hydrocarbon group having a carbon number of 1-20, M' is a tin atom, a silicon atom, a germanium atom or a phosphorus atom, X is a halogen atom, and n is an integer of 0-3).

When M' in the formula (2)~(4) is a tin atom, the example of the component (e) includes triphenyltin chloride, tributyltin chloride, tri-isopropyltin chloride, trihexyltin chloride, trioctyltin chloride, diphenyltin dichloride, dibutyltin dichloride, dihexyltin dichloride, dioctyltin dichloride, phenyltin trichloride, butyltin trichloride, octyltin trichloride, tin tetrachloride and the like.

When M' in the formula (2)~(4) is a silicon atom, the example of the component (e) includes triphenyl chlorosilane, trihexyl chlorosilane, trioctyl chlorosilane, tributyl chlorosilane, trimethyl chlorosilane, diphenyl dichlorosilane, dihexyl dichlorosilane, dioctyl dichlorosilane, dibutyl dichlorosilane, dimethyl dichlorosilane, methyl dichlorosilane, phenyl chlorosilane, hexyl trichlorosilane, octyl trichlorosilane, butyl trichlorosilane, methyl trichlorosilane, silicon tetrachloride and the like.

When M' in the formula (2)~(4) is a germanium atom, the example of the component (e) includes triphenylgermanium chloride, dibutylgermanium dichloride, diphenylgermanium dichloride, butylgermanium trichloride, germanium tetrachloride and the like.

When M' in the formula (2)~(4) is a phosphorus atom, the example of the component (e) includes phosphorus trichloride and the like.

As the component (e), use may be made of an organometallic compound containing ester group in its molecule shown by the following general formula (5):

$$R^4{}_n M'(-R^5-COOR^6)_{4-n} \quad (5)$$

(wherein $R^4$ and $R^5$ are the same or different and are a hydrocarbon group having a carbon number of 1-20, $R^6$ is a hydrocarbon group having a carbon number of 1-20 and may contain an ester group in its side chain, M' is a tin atom, a silicon atom, a germanium atom or a phosphorus atom, and n is an integer of 0-3).

As the component (e), the above compounds may be used by combining them in an arbitrary ratio.

The component (f) to be reacted with the active terminal of the unmodified polymer is a heterocumulene compound having a chemical structure shown in the following general formula (6):

$$Y=C=Z \quad (6)$$

(wherein Y is a carbon atom, an oxygen atom, a nitrogen atom or a sulfur atom, and Z is an oxygen atom, a nitrogen atom or a sulfur atom).

That is, the component (f) is a ketene compound when Y is a carbon atom and Z is an oxygen atom, a thioketene compound when Y is a carbon atom and Z is a sulfur atom, an isocyanate compound when Y is a nitrogen atom and Z is an oxygen atom, a thioisocyanate compound when Y is a nitrogen atom and Z is a sulfur atom, a carbodiimide compound when both Y and Z are nitrogen atoms, carbon dioxide when both Y and Z are oxygen atoms, a carbonyl sulfide when Y is an oxygen atom and Z is a sulfur atom, or carbon disulfide when both Y and Z are sulfur atoms. However, Y and Z in the formula (6) is not limited to these combinations.

As the ketene compound, mention may be made of ethylketene, butylketene, phenylketene, toluylketene and the like.

As the thioketene compound, mention may be made of ethylene thioketene, butylthioketene, phenylthioketene, toluylthioketene and the like.

As the isocyanate compound, mention may be made of phenyl isocyanate, 2,4-tolylene diisocyanate, 2,6-tolylene diisocyanate, diphenylmethane diisocyanate, polymeric type diphenylmethane diisocyanate, hexamethylene diisocyanate and the like.

As the thioisocyanate compound, mention may be made of phenyl thioisocyanate, 2,4-tolylene dithioisocyanate, hexamethylene dithioisocyanate and the like.

As the carbodiimide compound, mention may be made of N,N'-diphenylcarbodiimide, N,N'-diethylcarbodiimide and the like.

The component (g) to be reacted with the active terminal of the unmodified polymer is a hetero three-membered-ring containing compound having a chemical structure shown by the following general formula (7):

(7)

(wherein Y' is an oxygen atom, a nitrogen atom or a sulfur atom).

That is, the component (g) is an epoxy compound when Y' is an oxygen atom, an ethyleneimine compound when Y' is a nitrogen atom, or a thiirane compound when Y' is a sulfur atom.

As the epoxy compound, mention may be made of ethylene oxide, propylene oxide, cyclohexene oxide, styrene oxide, epoxidated soybean oil, epoxidated natural rubber and the like.

As the ethyleneimine compound, mention may be made of ethyleneimine, propyleneimine, N-phenyl ethyleneimine, N-(β-cyanoethyl) ethyleneimine and the like.

As the thiirane compound, mention may be made of thiirane, methyl thiirane, phenyl thiirane and the like.

The component (h) to be reacted with the active terminal of the unmodified polymer is a halogenated isocyano compound having a chemical structure shown by the following general formula (21):

—N=C—X    (21)

(wherein X is a halogen atom).

As the halogenated isocyano compound, mention may be made of 2-amino-6-chloropyridine, 2,5-dibromopyridine, 4-chloro-2-phenyl quinazoline, 2,4,5-tribromo imidazole, 3,6-dichloro-4-methylpyridazine, 3,4,5-trichloro pyridazine, 4-amino-6-chloro-2-mercapto pyrimidine, 2-amino-4-chloro-6-methylpyrimidine, 2-amino-4,6-dichloro pyrimidine, 6-chloro-2,4-dimethoxy pyrimidine, 2-chloropyrimidine, 2,4-dichloro-6-methylpyrimidine, 4,6-dichloro-2-(methylthio) pyrimidine, 2,4,5,6-tetrachloro pyrimidine, 2,4,6-trichloro pyrimidine, 2-amino-6-chloro pyrazine, 2,6-dichloro pyrazine, 2,4-bis(methylthio)-6-chloro-1,3,5-triazine, 2,4,6-trichloro-1,3,5-triazine, 2-bromo-5-nitrothiazole, 2-chlorobenzo thiazole, 2-chlorobenzo oxazole and the like.

The component (i) to be reacted with the active terminal of the unmodified polymer is a carboxylic acid, an acid halide, an ester compound, a carbocylic ester compound or an acid anhydride having a chemical structure as shown by the following formulae (8)-(13):

$R^7-(COOH)_m$    (8)

$R^8-(COX)_m$    (9)

$R^9-(COO-R^{10})$    (10)

$R^{11}-OCOO-R^{12}$    (11)

$R^{13}-(COOCO-R^{14})_m$    (12)

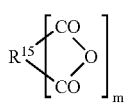

(13)

(wherein $R^7$ to $R^{15}$ re the same or different and are a hydrocarbon group having a carbon number of 1-50, X is a halogen atom, and M is an integer of 1-5).

As the carboxylic acid shown by the formula (8), mention may be made of acetic acid, stearic acid, adipic acid, maleic acid, benzoic acid, acrylic acid, methacrylic acid, phthalic acid, isophthalic acid, terephthalic acid, trimellitic acid, pyromellitic acid, mellitic acid, full or partial hydrate of polymethacrylic acid ester compound or polyacrylic acid ester compound and the like.

As the acid halide shown by the formula (9), mention may be made of acetic acid chloride, propionic acid chloride, butanoic acid chloride, isobutanoic acid chloride, octanoic acid chloride, acrylic acid chloride, benzoic acid chloride, stearic acid chloride, phthalic acid chloride, maleic acid chloride, oxalic acid chloride, acetyl iodide, benzoyl iodide, acetyl fluoride, benzoyl fluoride and the like.

As the ester compound shown by the formula (10), mention may be made of ethyl acetate, ethyl stearate, diethyl adipate, diethyl maleate, methyl benzoate, ethyl acrylate, ethyl methacrylate, diethyl phthalate, dimethyl terephthalate, tributyl trimellitate, tetraoctyl pyromellitate, hexamethyl mellitate, phenyl acetate, polymethyl methacrylate, polyethyl acrylate, polyisobutyl acrylate and the like. As the carbonic ester compound shown by the formula (11), mention may be made of dimethyl carbonate, diethyl carbonate, dipropyl carbonate, dihexyl carbonate, diphenyl carbonate and the like.

As the intermolecular acid anhydride shown by the formula (12), mention may be made of acetic anhydride, propionic anhydride, isobutyric anhydride, isovaleric anhydride, heptanoic anhydride, cinnamic anhydride, benzoic anhydride and the like. As the intramolecular acid anhydride shown by the formula (13), succinic anhydride, methylsuccinic anhydride, maleic anhydride, glutaric anhydride, citraconic anhydride, phthalic anhydride, styrene-maleic anhydride copolymer and the like.

Moreover, the compound as the component (i) may contain a non-protonic polar group such as ether group, tertiary amino group or the like in its molecule within a range not damaging the object of the invention. And also, the compounds as the component (i) may be used alone or in a combination of two or more compounds. Further, the component (i) may contain a compound having free alcohol group or phenyl group as an impurity.

The component (j) to be reacted with the active terminal of the unmodified polymer is a metal salt of carboxylic acid having a structure as shown by the formulae (14)-(16):

$R^{16}_aM''(OCOR^{17})_{4-a}$    (14)

$R^{18}_aM''(OCO-R^{19}-COOR^{20})_{4-a}$    (15)

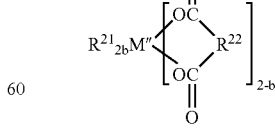

(16)

(wherein $R^{16}$ to $R^{22}$ are the same or different and are a hydrocarbon group having a carbon number of 1-20, M" is a tin atom, a silicon atom or a germanium atom, and a is an integer of 0-3 and b is an interger of 0-1).

As the compound shown by the formula (14), mention may be made of triphenyltin laurate, triphenyltin-2-ethylhexatate, triphenyltin naphthenate, triphenyltin acetate, triphenyltin acrylate, tri-n-butyltin laurate, tri-n-butyltin-2-ethylhexatate, tri-n-butyltin naphthenate, tri-n-butyltin acetate, tri-n-butyltin acrylate, tri-t-butyltin laurate, tri-t-butyltin-2-ethylhexatate, tri-t-butyltin naphthenate, tri-t-butyltin acetate, tri-t-butyltin acrylate, tri-isobutyltin laurate, tri-isobutyltin-2-ethylhexatate, tri-isobutyltin naphthenate, tri-isobutyltin acetate, tri-isobutyltin acrylate, tri-isopropyltin laurate, tri-ispropyltin-2-ethylhexatate, tri-isopropyltin napthenate, tri-isopropyltin acetate, tri-isopropyltin acrylate, trihexyltin laurate, trihexyltin-2-ethylhexatate, trihexyltin acetate, trihexyltin acrylate, trioctyltin laurate, trioctyltin-2-ethylhexatate, trioctyltin napthenate, trioctyltin acetate, trioctyltin acrylate, tri-2-ethylhexyltin laurate, tri-2-ethylhexyltin-2-ethylhexatate, tri-2-ethylhexyltin naphthenate, tri-2-ethylhexyltin naphthenate, tri-2-ethylhexyltin acetate, tri-2-ethylhexyltin acrylate, tristearyltin laurate, tristearyltin-2-ethylhexatate, tristearyltin naphthenate, tristearyltin acetate, tristearyltin acrylate, tribenzyltin laurate, tribenzyltin-2-ethylhexatate, tribenzyltin naphthenate, tribenzyltin acetate, tribenzyltin acrylate, diphenyltin dilaurate, diphenyltin-di-2-ethylhexatate, diphenyltin distearate, diphenyltin dinaphthenate, diphenyltin diacetate, diphenyltin diacrylate, di-n-butyltin dilaurate, di-n-butyltin-di-2-ethylhexatate, di-n-butyltin distearate, di-n-butyltin dinaphthenate, di-n-butyltin diacetate, di-n-butyltin diacrylate, di-t-butyltin dilaurate, di-t-butyltin-di-2-ethylhexatate, di-t-butyltin distearate, di-t-butyltin dinaphthenate, di-t-butyltin diacetate, di-t-butyltin diacrylate, di-isobutyltin dilaurate, di-isobutyltin di-2-ethylhaxatate, di-isobutyltin distearate, di-isobutyltin dinaphthenate, di-isobutyltin diacetate, di-isobutyltin diacrylate, di-isopropyltin dilaurate, di-isopropyltin-di-2-ethylhexatate, di-isopropyltin distearate, di-isopropyltin dinaphthenate, di-isopropyltin diacetate, di-isopropyltin diacrylate, dihexyltin dilaurate, dihexyltin di-2-ethylhexatate, dihexyltin distearate, dihexyltin dinaphthenate, dihexyltin diacetate, dihexyltin diacrylate, di-2-ethylhexyltin dilaurate, di-2-ethylhexyltin-di-2-ethylhexatate, di-2-ethylhexyltin distearate, di-2-ethylhexyltin dinaphthenate, di-2-ethylhexyltin diacetate, di-2-ethylhexyltin diacrylate, dioctyltin dilaurate, dioctyltin di-2-ethylhexatate, dioctyltin distearate, dioctyltin dinaphthenate, dioctyltin diacetate, dioctyltin diacrylate, distearyltin dilaurate, distearyltin-di-2-ethylhexatate, distearyltin distearate, distearyltin dinaphthenate, distearyltin diacetate, distearyltin diacrylate, dibenzyltin dilaurate, dibenzyltin di-2-ethylhexatate, dibenzyltin distearate, dibenzyltin dinaphthenate, dibenzyltin diacetate, dibenzyltin diacrylate, phenyltin trilaurate, phenyltin tri-2-ethylhexatate, phenyltin trinaphthenate, phenyltin triacetate, phenyltin triacrylate, n-butyltin trilaurate, n-butyltin tri-2-ethylhexatate, n-butyltin trinaphthenate, n-butyltin triacetate, n-butyltin triacrylate, t-butyltin trilaurate, t-butyltin tri-2-ethylhexatate, t-butyltin trinaphthenate, t-butyltin triacetate, t-butyltin triacrylate, isobutyltin trilaurate, isobutyltin tri-2-ethylhexatate, isobutyltin trinapthenate, isobutyltin triacetate, isobutyltin triacrylate, isobutyltin trilaurate, isopropyltin tri-2-ethylhexatate, isopropyltin trinaphthenate, isopropyltin triacetate, isopropyltin triacrylate, hexyltin trilaurate, hexyltin tri-2-ethylhexatate, hexyltin trinaphthenate, hexyltin triacetate, hexyltin triacrylate, octyltin trilaurate, octyltin tri-2-ethylhexatate, octyltin trinaphthenate, octyltin triacetate, octyltin triacrylate, 2-ethylhexyltin trilaurate, 2-ethylhexyltin tri-2-ethylhexatate, 2-ethylhexyltin trinaphthenate, 2-ethylhexyltin triacetate, 2-ethylhexyltin triacrylate, stearyltin trilaurate, stearyltin tri-2-ethylhexatate, stearyltin trinaphthenate, stearyltin triacetate, stearyltin triacrylate, benzyltin trilaurate, benzyltin tri-2-ethylhexatate, benzyltin trinaphthenate, benzyltin triacetate, benzyltin triacrylate and the like.

As the compound shown by the formula (15), mention may be made of diphenyltin bismethylmaleate, diphenyltin bis(2-ethylhexatate), diphenyltin bis(octylmaleate), diphenyltin bisbenzylmaleate, di-n-butyltin bismethylmaleate, di-n-butyltin bis(2-ethylhexatate), di-n-butyltin bis(octylmaleate), di-n-butyltin bis(benzylmaleate), di-t-butyltin bismethylmaleate, di-t-butyltin bis(2-ethylhexatate), di-t-butyltin bis(octylmaleate), di-t-butyltin bisbenzyl-maleate, di-isobutyltin bismethylmaleate, di-isobutyltin bis-2-ethylhexatate, di-isobutyltin bisoctylmaleate, di-isobutyltin bisbenzylmaleate, di-isopropyltin bismethy-lmaleate, di-isopropyltin bis-2-ethylhexatate, di-isopropyltin bisoctylmaleate, di-isopropyltin bisbenzyl-maleate, dihexyltin bismethylmaleate, dihexyltin bis-2-ethylhexatate, dihexyltin bisoctylmaleate, dihexyltin bisbenzylmaleate, di-2-ethylhexyltin bismethylmaleate, di-2-ethylhexyltin bis-2-ethylhexatate, di-2-ethylhexyltin bisoctylmaleate, di-2-ethylhexyltin bisbenzylmaleate, dioctyltin bismethylmaleate, dioctyltin bis-2-ethylhexatate, dioctyltin bisoctylmaleate, dioctyltin bisbenzylmaleate, distearyltin bismethylmaleate, distearyltin bis-2-ethylhexatate, distearyltin bisoctylmaleate, distearyltin bisbenzylmaleate, dibenzyltin bismethylmaleate, dibenzyltin bis-2-ethylhexatate, dibenzyltin bisoctylmaleate, dibenzyltin bisbenzylmaleate, diphenyltin bismethyladitate, diphenyltin bisoctyladitate, diphenyltin bisbenzyladitate, di-n-butyltin bismethyladitate, di-n-butyltin bisoctyladitate, di-n-butyltin bisbenzyladitate, di-t-butyltin bismethyladitate, di-t-butyltin bisoctyladitate, di-t-butyltin bisbenzyladitate, di-isobutyltin bismethyladitate, di-isobutyltin bisoctyladitate, di-isobutyltin bisbenzyladitate, di-isopropyltin bismethyladitate, di-isopropyltin bisoctyladitate, di-isopropyltin bisbenzyladitate, dihexyltin bismethyladitate, dihexyltin bisoctyladitate, dihexyltin bisbenzyladitate, di-2-ethylhexyltin bismethyladitate, di-2-ethylhexyltin bisoctyladitate, di-2-ethylhexyltin bisbenzyladitate, dioctyltin bismethyladitate, dioctyltin bisoctyladitate, distearyltin bismethyladitate, distearyltin bisoctyladitate, dioctyltin bisbenzyladitate, distearyltin bisbenzyladitate, dibenzyltin bismethyladitate, dibenzyltin bisoctyladitate, dibenzyltin bisbenzyladitate and the like.

As the compound shown by the formula (16), mention may be made of diphenyltin maleate, di-n-butyltin maleate, di-t-butyltin maleate, di-isobutyltin maleate, di-isopropyltin maleate, di-isopropyltin maleate, dihexyltin maleate, di-2-ethylhexyltin maleate, dioctyltin maleate, distearyltin maleate, dibenzyltin maleate, diphenyltin aditate, di-n-butyltin aditate, di-t-butyltin aditate, di-isobutyltin aditate, di-isopropyltin aditate, dihexyltin aditate, di-2-ethylhexyltin adiate, dioctyltin aditate, distearyltin aditate, dibenzyltin aditate and the like.

The components (e)-(j) as a modifying agent may be used alone or in admixture of two or more components.

The amount of the modifying agent used to the component (a) is 0.01-200, preferably 0.1-150 as a molar ratio. When the amount is less than 0.01, the reaction does not sufficiently proceed and the effect of improving the wear resistance and cold flow is not developed, while when it exceeds 200, the effect of improving the properties is saturated, and it is not preferable from a viewpoint of economical reason, and an insoluble matter in toluene (gel) is undesirably created according to occasions.

It is desirable that the modification reaction is carried out at a temperature of not higher than 160° C., preferably −30° C.-+130° C. for 0.2-5 hours.

After the modification reaction, an objective polymer can be recovered by adding a short-stop and a polymerization stabilizer to the reaction system, if necessary, and conducting well-known desolvation and drying operation in the production of the conjugated diene polymer.

The conjugated diene polymer obtained after the modification preferably has a Mw/Mn ratio of not more than 4 and a cis-1,4-bond content of not less than 90%.

When the Mw/Mn ratio exceeds 4, the wear resistance becomes poor. When the cis-1,4-bond content is less than 90%, the wear resistance becomes poor. Preferably, the cis-1,4-bond content is not less than 93%.

Furthermore, the modified conjugated diene polymer is favorable to have a Mooney viscosity at 100° C. of 10-150. When the Mooney viscosity is less than 10, the wear resistance after vulcanization becomes poor, while when it exceeds 150, the processability in the kneading becomes poor.

And also, the weight-average molecular weight (Mw) in terms of polystyrene is usually 100,000-1,50,000, preferably 150,000-1,000,000. When Mw is outside the above range, the processability and properties of vulcanizate become undesirably poor.

The conjugated diene polymer(s) according to the invention is used in applications requiring mechanical properties and wear resistance such as tread, sidewall and various rubber members in tires for passenger car, truck, bus and winter-season tires such as studless tire or the like, hoses, belts, vibration damping rubbers, various industrial goods and the like by using the polymer alone or blending with another synthetic rubber or natural rubber, extending with a process oil, if necessary, and adding with a filler such as carbon black or the like, a vulcanizing agent, a vulcanization accelerator and the other usual additives and then vulcanizing them. As the synthetic rubber, use may be made of emulsion-polymerized SBR, solution-polymerized SBR, polyisoprene, EP(D)M, butyl rubber, hydrogenated BR, hydrogenated SBR and the like.

The following examples are given in illustration of the invention and are not intended as limitations thereof.

In these examples, part and % are by weight otherwise specified. And also, various measurements in these examples are conducted according to the following methods.

Mooney Viscosity ($ML_{1+4}$, 100° C.)

It is measured at a temperature of 100° C. for a measuring time of 4 minutes after the preliminary heating for 1 minute.

Microstructure (cis-1,4-bond Content, Vinyl-1,2-bond Content)

It is measured by an infrared ray method (Morero's method).

Number-average Molecular Weight (Mn), Weight-average Molecular Weight (Mw)

It is measured by using HLC-8120GPC made by Toso Co., ltd and a differential refractometer as a detector under the following conditions:
Column: column GMHHXL made by Toso Co., Ltd.
Mobile phase: tetrahydrofuran Cold Flow It is measured by extruding a polymer through an orifice of ¼ inch at a temperature of 50° C. under a pressure of 3.5 lb/in². After the polymer is left to stand for 10 minutes for obtaining a steady state, the extrusion rate is measured and the measured value is represented by milligram every minute (mg/min).

[Properties of Vulcanizate]

Tensile Strength

It is measured according to JIS K6301. In this case, tensile strength at break (TB) and elongation at break (EB) are measured.

Rebound Resilience

It is measured at 50° C. by using a rebound resilience tester made by Dunlop Corp.

Wear Resistance

It is measured at a slip ratio of 60% and room temperature by using a Lambourn abrasion tester (made by Shimada Giken Co., Ltd.). The wear resistance is represented by an index on the basis that Comparative Example 3 is 100.

As to the measurement of properties of vulcaniate, a test specimen is produced by using a polymer prepared in the following example or comparative example and kneading it with other ingredients according to the following compounding recipe and then press-vulcanizing them at 145° C. for an optimum time.

| Compounding recipe | (part) |
|---|---|
| Polymer | 50 |
| Natural rubber | 50 |
| Carbon black ISAF | 50 |
| Zinc white | 3 |
| Stearic acid | 3 |
| Antioxidant (*1) | 1 |
| Vulcanization accelerator (*2) | 0.8 |
| Sulfur | 1.5 |

(*1) N-isopropyl-N'-phenyl-p-phenylenediamine
(*2) N-cyclohexyl-2-benzothiazyl sulfenamide

EXAMPLE 1

Into an autoclave of 5 liter in capacity purged with nitrogen are charged 2.5 kg of cyclohexane and 300 g of 1,3-butadiene in a nitrogen atmosphere.

Into the resulting mixture is charged a catalyst obtained by previously mixing a cyclohexane solution containing neodymium octanoate (0.18 mol) and acetylacetone (0.37 mmol), a solution of methylaluminoxane (18.5 mmol) in toluene, a solution of di-isobutylaluminum hydride (3.9 mmol) in hexane and a solution of diethylaluminum chloride (0.37 mmol) in hexane and aging them with an amount of 1,3-butadiene corresponding to 5 times of neodymium amount at 25° C. for 30 minutes to conduct polymerization at 50° C. for 30 minutes. The reaction conversion of 1,3-butadiene is approximately 100%. In order to measure Mooney viscosity, a part of the resulting unmodified polymer solution is taken out and solidified and dried. The Mooney viscosity is 30, the cis-1,4-bond content is 97.0%, and the vinyl-1,2-bond content is 1.1%, and Mw/Mn ratio is 2.2.

Then, the unmodified polymer solution is added with tin tetrachloride (7.2 mmol) as a modifying agent while maintaining the temperature at 50° C. and thereafter left to stand for 30 minutes with stirring and then added with a methanol solution containing 1.5 g of 2,4-di-t-butyl-p-cresol to stop polymerization, which is desolvated by steam stripping and dried on a roll at 110° C. to obtain a modified polymer.

This polymer has a Mooney viscosity ($ML_{1+4}$, 100° C.) of 42 and a cold flow of 1.5 mg/min. Furthermore, a vulcanizate obtained by using this polymer has properties as shown in Table 1.

EXAMPLE 2

A polymer is obtained in the same manner as in Example 1 except that phenyltin trichloride (9.40 mmol) is used as a modifying agent to be reacted with the unmodified polymer of Example 1. The properties of this polymer and properties of a vulcanizate using the same are measured to obtain results as shown in Table 1. Moreover, the polymer before the addition of the above modifying agent has a Mooney viscosity of 31, a cis-1,4-bond content of 97.2%, a vinyl-1,2-bond content of 1.2% and a Mw/Mn ratio of 2.2.

EXAMPLE 3

A polymer is obtained in the same manner as in Example 1 except that silicon tetrachloride (7.20 mmol) is used as a modifying agent to be reacted with the unmodified polymer of Example 1. The properties of this polymer and properties of a vulcanizate using the same are measured to obtain results as shown in Table 1. Moreover, the polymer before the addition of the modifying agent has a Mooney viscosity of 29, a cis-1,4-bond content of 97.1%, a vinyl-1,2-bond content of 1.1% and a Mw/Mn ratio of 2.1.

EXAMPLE 4

A polymer is obtained in the same manner as in Example 1 except that polymeric type diphenylmethane diisocyanate (c-MDI, 7.20 mmol) is used as a modifying agent to be reacted with the unmodified polymer of Example 1. The properties of this polymer and properties of a vulcanizate using the same are measured to obtain results as shown in Table 1. Moreover, the polymer before the addition of the modifying agent has a Mooney viscosity of 32, a cis-1,4-bond content of 97.1%, a vinyl-1,2-bond content of 1.2% and a Mw/Mn ratio of 2.2.

EXAMPLE 5

A polymer is obtained in the same manner as in Example 1 except that carbon disulfide (14.40 mmol) is used as a modifying agent to be reacted with the unmodified polymer of Example 1. The properties of this polymer and properties of a vulcanizate using the same are measured to obtain results as shown in Table 1. Moreover, the polymer before the addition of the modifying agent has a Mooney viscosity of 32, a cis-1,4-bond content of 96.9%, a vinyl-1,2-bond content of 1.2% and a Mw/Mn ratio of 2.1.

EXAMPLE 6

A polymer is obtained in the same manner as in Example 1 except that styrene oxide (14.40 mmol) is used as a modifying agent to be reacted with the unmodified polymer of Example 1. The properties of this polymer and properties of a vulcanizate using the same are measured to obtain results as shown in Table 2. Moreover, the polymer before the addition of the modifying agent has a Mooney viscosity of 31, a cis-1,4-bond content of 97.2%, a vinyl-1,2-bond content of 1.3% and a Mw/Mn ratio of 2.3.

EXAMPLE 7

A polymer is obtained in the same manner as in Example 1 except that 2,4,6-trichloro-1,3,5-triazine (TCT, 14.40 mmol) is used as a modifying agent to be reacted with the unmodified polymer of Example 1. The properties of this polymer and properties of a vulcanizate using the same are measured to obtain results as shown in Table 2. Moreover, the polymer before the addition of the modifying agent has a Mooney viscosity of 31, a cis-1,4-bond content of 97.0%, a vinyl-1,2-bond content of 1.1% and a Mw/Mn ratio of 2.2.

EXAMPLE 8

A polymer is obtained in the same manner as in Example 1 except that adipic acid (3.60 mmol) is used as a modifying agent to be reacted with the unmodified polymer of Example 1. The properties of this polymer and properties of a vulcanizate using the same are measured to obtain results as shown in Table 2. Moreover, the polymer before the addition of the modifying agent has a Mooney viscosity of 30, a cis-1,4-bond content of 97.0%, a vinyl-1,2-bond content of 1.1% and a Mw/Mn ratio of 2.2.

EXAMPLE 9

A polymer is obtained in the same manner as in Example 1 except that dimethyl terephthalate (3.60 mmol) is used as a modifying agent to be reacted with the unmodified polymer of Example 1. The properties of this polymer and properties of a vulcanizate using the same are measured to obtain results as shown in Table 2. Moreover, the polymer before the addition of the modifying agent has a Mooney viscosity of 31, a cis-1,4-bond content of 97.1%, a vinyl-1,2-bond content of 1.2% and a Mw/Mn ratio of 2.1.

EXAMPLE 10

A polymer is obtained in the same manner as in Example 1 except that isophthalic acid chloride (3.60 mmol) is used as a modifying agent to be reacted with the unmodified polymer of Example 1. The properties of this polymer and properties of a vulcanizate using the same are measured to obtain results as shown in Table 2. Moreover, the polymer before the addition of the modifying agent has a Mooney viscosity of 30, a cis-1,4-bond content of 97.1%, a vinyl-1,2-bond content of 1.3% and a Mw/Mn ratio of 2.1.

EXAMPLE 11

A polymer is obtained in the same manner as in Example 1 except that diethyl adipate (3.60 mmol) is used as a modifying agent to be reacted with the unmodified polymer of Example 1. The properties of this polymer and properties of a vulcanizate using the same are measured to obtain results as shown in Table 3. Moreover, the polymer before the addition of the modifying agent has a Mooney viscosity of 29, a cis-1,4-bond content of 96.9%, a vinyl-1,2-bond content of 1.2% and a Mw/Mn ratio of 2.2.

EXAMPLE 12

A polymer is obtained in the same manner as in Example 1 except that diphenyl carbonate (3.60 mmol) is used as a modifying agent to be reacted with the unmodified polymer of Example 1. The properties of this polymer and properties of a vulcanizate using the same are measured to obtain results as shown in Table 3. Moreover, the polymer before the addition of the modifying agent has a Mooney viscosity of 32, a cis-1,4-bond content of 97.2%, a vinyl-1,2-bond content of 1.1% and a Mw/Mn ratio of 2.2.

EXAMPLE 13

A polymer is obtained in the same manner as in Example 1 except that heptanoic anhydride (5.40 mmol) is used as a modifying agent to be reacted with the unmodified polymer of Example 1. The properties of this polymer and properties of a vulcanizate using the same are measured to obtain results as shown in Table 3. Moreover, the polymer before the addition of the modifying agent has a Mooney viscosity of 31, a cis-1,4-bond content of 97.0%, a vinyl-1,2-bond content of 1.2% and a Mw/Mn ratio of 2.3.

EXAMPLE 14

A polymer is obtained in the same manner as in Example 1 except that citraconic anhydride (5.40 mmol) is used as a modifying agent to be reacted with the unmodified polymer of Example 1. The properties of this polymer and properties of a vulcanizate using the same are measured to obtain results as shown in Table 3. Moreover, the polymer before the addition of the modifying agent has a Mooney viscosity of 31, a cis-1,4-bond content of 96.9%, a vinyl-1,2-bond content of 1.2% and a Mw/Mn ratio of 2.1.

EXAMPLE 15

A polymer is obtained in the same manner as in Example 1 except that 0.90 mmol of divinylbenzene is used instead of 1,3-butadiene in the preparation of the catalyst. The properties of this polymer and properties of a vulcanizate using the same are measured to obtain results as shown in Table 3. Moreover, the polymer before the addition of the modifying agent has a Mooney viscosity of 31, a cis-1,4-bond content of 97.1%, a vinyl-1,2-bond content of 1.1% and a Mw/Mn ratio of 2.2.

EXAMPLE 16

A polymer is obtained in the same manner as in Example 1 except that dioctyltin dilaurate (14.2 mmol) is used as a modifying agent to be reacted with the unmodified polymer of Example 1. The properties of this polymer and properties of a vulcanizate using the same are measured to obtain results as shown in Table 4. Moreover, the polymer before the addition of the modifying agent has a Mooney viscosity of 32, a cis-1,4-bond content of 97.0%, a vinyl-1,2-bond content of 1.2% and a Mw/Mn ratio of 2.2.

EXAMPLE 17

A polymer is obtained in the same manner as in Example 1 except that dioctyltin bisoctylmaleate (14.2 mmol) is used as a modifying agent to be reacted with the unmodified polymer of Example 1. The properties of this polymer and properties of a vulcanizate using the same are measured to obtain results as shown in Table 4. Moreover, the polymer before the addition of the modifying agent has a Mooney viscosity of 29, a cis-1,4-bond content of 96.9%, a vinyl-1,2-bond content of 1.1% and a Mw/Mn ratio of 2.1.

EXAMPLE 18

A polymer is obtained in the same manner as in Example 1 except that dioctyltin maleate (14.2 mmol) is used as a modifying agent to be reacted with the unmodified polymer of Example 1. The properties of this polymer and properties of a vulcanizate using the same are measured to obtain results as shown in Table 4. Moreover, the polymer before the addition of the modifying agent has a Mooney viscosity of 31, a cis-1,4-bond content of 97.1%, a vinyl-1,2-bond content of 1.2% and a Mw/Mn ratio of 2.1.

COMPARATIVE EXAMPLE 1

A polymer is obtained in the same manner as in Example 1 without reacting with the modifying agent. The properties of this polymer and properties of a vulcanizate using the same are measured to obtain results as shown in Table 5. Moreover, the unmodified polymer has a Mooney viscosity of 31, a cis-1,4-bond content of 97.0%, a vinyl-1,2-bond content of 1.1% and a Mw/Mn ratio of 2.2.

When Examples 1-18 are compared with Comparative Example 1, it is understood that the cold flow in these examples is low or the cold flow is reduced by polymerizing 1,3-butadiene in the neodymium catalyst system and reacting with the specified modifying agent.

COMPARATIVE EXAMPLE 2

A polymer is obtained in the same manner as in Comparative Example 1 except that the amount of methylaluminoxane is 4.7 mmol and the amount of di-isobutylaluminum hydride is 3.8 mmol. The properties of this polymer and properties of a vulcanizate using the same are measured to obtain results as shown in Table 5. Moreover, the unmodified polymer has a Mooney viscosity of 34, a cis-1,4-bond content of 97.0%, a vinyl-1,2-bond content of 1.1% and a Mw/Mn ratio of 3.6.

EXAMPLE 19

A polymer is obtained in the same manner as in Example 1 except that the amount of tin tetrachloride as a modifying agent is 14.4 mmol. The properties of this polymer and properties of a vulcanizate using the same are measured to obtain results as shown in Table 5. Moreover, the polymer before the addition of the modifying agent has a Mooney viscosity of 29, a cis-1,4-bond content of 97.2%, a vinyl-1,2-bond content of 1.2% and a Mw/Mn ratio of 2.2.

EXAMPLE 20

A polymer is obtained in the same manner as in Example 1 except that the amount of tin tetrachloride as a modifying agent is 21.6 mmol. The properties of this polymer and properties of a vulcanizate using the same are measured to obtain results as shown in Table 5. Moreover, the polymer before the addition of the modifying agent has a Mooney viscosity of 31, a cis-1,4-bond content of 97.1%, a vinyl-1,2-bond content of 1.1% and a Mw/Mn ratio of 2.2.

COMPARATIVE EXAMPLE 3

Vulcanization properties of a commercially available polybutadiene rubber (polybutadiene BR01, made by JSR Corporation) are shown in Table 5.

It is apparent from Examples 1, 19 and 20 that the effect of improving the cold flow becomes better as the amount of tin tetrachloride added increases.

TABLE 1

|  | Example 1 | Example 2 | Example 3 | Example 4 | Example 5 |
| --- | --- | --- | --- | --- | --- |
| Modifying agent | tin tetrachloride | phenyltin trichloride | silicon tetrachloride | c-MDI | carbon disulfide |
| addition amount (mmol) | 7.2 | 9.4 | 7.2 | 7.2 | 14.4 |
| Properties after the addition of modifying agent |  |  |  |  |  |
| cis-1,4-bond (%) | 97.0 | 97.2 | 97.1 | 97.1 | 96.9 |
| vinyl-1,2-bond (%) | 1.1 | 1.2 | 1.1 | 1.2 | 1.2 |
| Mw/Mn | 3.6 | 3.4 | 3.5 | 3.7 | 3.4 |
| Mooney viscosity ($ML_{1+4}$, 100° C.) | 42 | 38 | 40 | 39 | 41 |
| Cold flow (mg/min) | 1.5 | 1.6 | 1.6 | 1.5 | 1.8 |
| Properties of vulcanizate |  |  |  |  |  |
| TB (MPa) | 27.2 | 27.1 | 26.6 | 26.6 | 26.5 |
| EB (%) | 470 | 465 | 470 | 470 | 475 |
| Rebound resilience (25° C., %) | 64 | 63 | 63 | 62 | 63 |
| Wear resistance (index) | 135 | 140 | 122 | 132 | 127 |

TABLE 2

|  | Example 6 | Example 7 | Example 8 | Example 9 | Example 10 |
| --- | --- | --- | --- | --- | --- |
| Modifying agent | styrene oxide | TCT | adipic acid | dimethyl terephthalate | isophthalic acid chloride |
| addition amount (mmol) | 14.4 | 14.4 | 3.6 | 14.4 | 3.6 |
| Properties after the addition of modifying agent |  |  |  |  |  |
| cis-1,4-bond (%) | 97.2 | 97.0 | 97.0 | 97.1 | 97.1 |
| vinyl-1,2-bond (%) | 1.3 | 1.1 | 1.1 | 1.2 | 1.3 |
| Mw/Mn | 3.5 | 3.4 | 3.3 | 3.3 | 3.6 |
| Mooney viscosity ($ML_{1+4}$, 100° C.) | 43 | 42 | 37 | 36 | 37 |
| Cold flow (mg/min) | 1.7 | 1.8 | 1.6 | 1.7 | 1.6 |
| Properties of vulcanizate |  |  |  |  |  |
| TB (MPa) | 26.6 | 26.6 | 26.5 | 26.7 | 26.4 |
| EB (%) | 465 | 470 | 470 | 475 | 465 |
| Rebound resilience (25° C., %) | 61 | 61 | 62 | 63 | 63 |
| Wear resistance (index) | 128 | 121 | 120 | 121 | 122 |

TABLE 3

|  | Example 11 | Example 12 | Example 13 | Example 14 | Example 15 |
| --- | --- | --- | --- | --- | --- |
| Modifying agent | diethyl adipate | diphenyl carbonate | heptanoic anhydride | citraconic anhydride | tin tetrachloride |
| addition amount (mmol) | 3.6 | 3.6 | 5.4 | 5.4 | 7.2 |
| Properties after the addition of modifying agent |  |  |  |  |  |
| cis-1,4-bond (%) | 96.9 | 97.2 | 97.0 | 96.9 | 97.1 |
| vinyl-1,2-bond (%) | 1.2 | 1.1 | 1.2 | 1.2 | 1.1 |
| Mw/Mn | 3.4 | 3.5 | 3.6 | 3.4 | 3.6 |
| Mooney viscosity ($ML_{1+4}$, 100° C.) | 38 | 37 | 36 | 36 | 42 |
| Cold flow (mg/min) | 1.6 | 1.7 | 1.8 | 1.6 | 1.6 |
| Properties of vulcanizate |  |  |  |  |  |
| TB (MPa) | 26.5 | 26.4 | 26.6 | 26.6 | 27.2 |
| EB (%) | 475 | 470 | 470 | 470 | 470 |
| Rebound resilience (25° C., %) | 64 | 64 | 63 | 64 | 64 |
| Wear resistance (index) | 123 | 120 | 122 | 121 | 135 |

TABLE 4

|  | Example 16 | Example 17 | Example 18 |
|---|---|---|---|
| Modifying agent | dioctyltin dilaurate | dioctyltin bisoctylmaleate | dioctyltin maleate |
| addition amount (mmol) | 14.4 | 14.4 | 14.4 |
| Properties after the addition of modifying agent | | | |
| cis-1,4-bond (%) | 97.0 | 96.9 | 97.1 |
| vinyl-1,2-bond (%) | 1.2 | 1.1 | 1.2 |
| Mw/Mn | 3.3 | 3.5 | 3.2 |
| Mooney viscosity ($ML_{1+4}$, 100° C.) | 41 | 39 | 43 |
| Cold flow (mg/min) | 1.5 | 1.4 | 1.6 |
| Properties of vulcanizate | | | |
| TB (MPa) | 27.1 | 27 | 27.6 |
| EB (%) | 475 | 465 | 470 |
| Rebound resilience (25° C., %) | 65 | 63 | 66 |
| Wear resistance (index) | 137 | 135 | 138 |

TABLE 5

|  | Example 19 | Example 20 | Comparative Example 1 | Comparative Example 2 | Comparative Example 3 |
|---|---|---|---|---|---|
| Modifying agent | tin tetrachloride | tin tetrachloride | — | — | — |
| addition amount (mmol) | 14.4 | 21.6 | — | — | — |
| Properties after the addition of modifying agent | | | | | |
| cis-1,4-bond (%) | 97.2 | 97.1 | 97.0 | 97.0 | — |
| vinyl-1,2-bond (%) | 1.2 | 1.1 | 1.1 | 1.1 | — |
| Mw/Mn | 3.9 | 4.0 | — | — | — |
| Mooney viscosity ($ML_{1+4}$, 100° C.) | 49 | 56 | — | — | — |
| Cold flow (mg/min) | 0.7 | 0.3 | 18.5 | 15.5 | — |
| Properties of vulcanizate | | | | | |
| TB (MPa) | 27.4 | 27.6 | 26.5 | 25.8 | 25.7 |
| EB (%) | 465 | 460 | 470 | 510 | 530 |
| Rebound resilience (25° C., %) | 65 | 66 | 63 | 56 | 54 |
| Wear resistance (index) | 137 | 140 | 120 | 105 | 100 |

COMPARATIVE EXAMPLE 4

Into an autoclave of 5 liter in capacity purged with nitrogen are charged 2.4 kg of cyclohexane and 300 g of 1,3-butadiene in a nitrogen atmosphere.

Into the resulting mixture is charged a catalyst obtained by previously mixing a solution of neodymium octanoate (Nd(Oct)$_3$, 0.09 mmol) in cyclohexane, a solution of methylaluminoxane (MAO, 2.7 mmol) in toluene, a solution of di-isobutylaluminum hydride (AliBu$_2$H, 4.7 mmol) and diethylaluminum chloride (AlEt$_2$Cl, 0.09 mmol) in cyclohexane and aging them with an amount of 1,3-butadiene corresponding to 5 times of neodymium amount at 50° C. for 30 minutes to conduct polymerization at 80° C. for 1 hour.

After the completion of polymerization, a methanol solution containing 0.3 g of 2,4-di-t-butyl-p-cresol is added to the polymerization system to stop polymerization, which is desolvated by steam stripping and dried on a roll at 110° C. to obtain an unmodified polymer.

This polymer has a yield of 290 g, a Mooney viscosity ($ML_{1+4}$, 100° C.) of 45, a cis-1,4-bond content of 96.5%, a vinyl-1,2-bond content of 1.4%, a Mw/Mn ratio of 2.9 and a cold flow of 15.0 mg/min. Furthermore, a vulcanizate obtained by using this polymer has properties as shown in Table 6.

COMPARATIVE EXAMPLE 5

A polymer is obtained in the same manner as in Comparative Example 4 without using diethylaluminum chloride. The properties of this polymer and properties of a vulcanizate using the same are measured to obtain results as shown in Table 6.

EXAMPLE 21

Into an autoclave of 5 liter in capacity purged with nitrogen are charged 2.5 kg of cyclohexane and 300 g of 1,3-butadiene in a nitrogen atmosphere.

Into the resulting mixture is charged a catalyst obtained by previously mixing a cyclohexane solution containing neodymium octanoate (Nd(Oct)$_3$, 0.09 mmol), a solution of methylaluminoxane (MAO, 2.7 mmol) in toluene, a solution of di-isobutylaluminum hydride (AliBU$_2$H, 5.2 mmol) in hexane and a solution of silicon tetrachloride (SiCl4, 0.09 mmol) in hexane and aging them with an amount of 1,3-butadiene corresponding to 5 times of neodymium amount at 25° C. for 30 minutes to conduct polymerization at 80° C. for 1 hour.

Then, the resulting unmodified polymer solution is added with a solution of butyltin trichloride (BuSnCl$_3$, 3.6 mmol) as a modifying agent in cyclohexane while maintaining the temperature at 80° C. and thereafter left to stand for 30 minutes with stirring and then added with a methanol solution containing 1.5 g of 2,4-di-t-butyl-p-cresol to stop polymerization, which is desolvated by steam stripping and dried on a roll at 110° C. to obtain a modified polymer.

This polymer has a Mooney viscosity ($ML_{1+4}$, 100° C.) of 45, a cold flow of 1.6 mg/min, a cis-1,4-bond content of 96.9%, a vinyl-1,2-bond content of 1.2% and a Mw/Mn ratio of 2.4. Furthermore, a vulcanizate obtained by using this polymer has properties as shown in Table 6.

EXAMPLE 22

A polymer is obtained in the same manner as in Example 21 except that polymeric type diphenylmethane diisocyanate (c-MDI) is used as a modifying agent. The properties of this polymer and properties of a vulcanizate using the same are measured to obtain results as shown in Table 6.

EXAMPLE 23

A polymer is obtained in the same manner as in Example 21 except that diethyl adipate ($C_4H_8(CO_2Et)_2$) is used as a modifying agent. The properties of this polymer and properties of a vulcanizate using the same are measured to obtain results as shown in Table 6.

EXAMPLE 24

A polymer is obtained in the same manner as in Example 21 except that styrene oxide (STO) is used as a modifying agent. The properties of this polymer and properties of a vulcanizate using the same are measured to obtain results as shown in Table 6.

EXAMPLE 25

A polymer is obtained in the same manner as in Example 21 except that 2,4,6-trichloro-1,3,5-triazine (TCT) is used as a modifying agent. The properties of this polymer and properties of a vulcanizate using the same are measured to obtain results as shown in Table 6.

EXAMPLE 26

A polymer is obtained in the same manner as in Example 21 except that dioctyltin bisoctylmaleate (DOTBOM) is used as a modifying agent. The properties of this polymer and properties of a vulcanizate using the same are measured to obtain results as shown in Table 6.

COMPARATIVE EXAMPLE 6

A polymer is obtained in the same manner as in Example 21 except that methylaluminoxane is not used and the amount of di-isobutylaluminum hydride is 4.7 mmol. The properties of this polymer and properties of a vulcanizate using the same are measured to obtain results as shown in Table 6.

COMPARATIVE EXAMPLE 7

A polymer is obtained in the same manner as in Example 21 except that the di-isobutylaluminum hydride is not used. The properties of this polymer and properties of a vulcanizate using the same are measured to obtain results as shown in Table 6.

TABLE 6

(a)

| | Catalyst component (mmol) | | | | | Polymer yield (g) |
|---|---|---|---|---|---|---|
| | Rare earth element compound | Aluminoxane | Organoaluminum compound | Component (b) | Modifying agent (mmol) | |
| Comparative Example 4 | $Nd(Oct)_3$ (0.09) | MAO (2.7) | $AliBu_2H$ (4.7) | $AlEt_2Cl$ (0.09) | — | 290 |
| Comparative Example 5 | $Nd(Oct)_3$ (0.09) | MAO (2.7) | $AliBu_2H$ (4.7) | — | — | 50 |
| Comparative Example 6 | $Nd(Oct)_3$ (0.09) | — | $AliBu_2H$ (4.7) | $SiCl_4$ (0.09) | $BuSnCl_3$ (3.6) | 150 |
| Comparative Example 7 | $Nd(Oct)_3$ (0.09) | MAO (2.7) | — | $SiCl_4$ (0.09) | $BuSnCl_3$ (3.6) | 190 |
| Example 21 | $Nd(Oct)_3$ (0.09) | MAO (2.7) | $AliBu_2H$ (5.2) | $SiCl_4$ (0.09) | $BuSnCl_3$ (3.6) | 290 |
| Example 22 | $Nd(Oct)_3$ (0.09) | MAO (2.7) | $AliBu_2H$ (5.2) | $SiCl_4$ (0.09) | c-MDI (3.6) | 285 |
| Example 23 | $Nd(Oct)_3$ (0.09) | MAO (2.7) | $AliBu_2H$ (5.2) | $SiCl_4$ (0.09) | $C_4H_8(CO_2Et)_2$ (3.6) | 285 |
| Example 24 | $Nd(Oct)_3$ (0.09) | MAO (2.7) | $AliBu_2H$ (5.2) | $SiCl_4$ (0.09) | STO (3.6) | 290 |
| Example 25 | $Nd(Oct)_3$ (0.09) | MAO (2.7) | $AliBu_2H$ (5.2) | $SiCl_4$ (0.09) | TCT (3.6) | 290 |
| Example 26 | $Nd(Oct)_3$ (0.09) | MAO (2.7) | $AliBu_2H$ (5.2) | $SiCl_4$ (0.09) | DOTBOM (3.6) | 290 |

(b)

| | Properties after the addition of modifying agent | | | | | Properties of vulcanizate | | | |
|---|---|---|---|---|---|---|---|---|---|
| | Mooney viscosity ($ML_{1+4}$, 100° C.) | Mw/Mn | cis-1,4-bond (%) | Vinyl-1,2-bond (%) | Cold flow (mg/min) | TB (MPa) | EB (%) | Rebound resilience (25° C., %) | Wear Resistance (index) |
| Comparative Example 4 | 45 | 2.9 | 96.5 | 1.4 | 15.0 | 26.4 | 490 | 60 | 113 |
| Comparative Example 5 | 72 | 6.7 | 76.7 | 10.6 | 0.7 | 21.6 | 360 | 45 | 81 |
| Comparative | 48 | 5.2 | 95.6 | 1.4 | 0.9 | 26.1 | 510 | 58 | 98 |

TABLE 6-continued

| Example 6 | | | | | | | | | |
|---|---|---|---|---|---|---|---|---|---|
| Comparative | 63 | 4.2 | 95.1 | 2.3 | 0.8 | 26.0 | 505 | 57 | 104 |
| Example 7 | | | | | | | | | |
| Example 21 | 45 | 2.4 | 96.9 | 1.2 | 1.6 | 27.3 | 480 | 69 | 130 |
| Example 22 | 45 | 2.5 | 96.8 | 1.1 | 1.7 | 26.9 | 475 | 68 | 128 |
| Example 23 | 43 | 2.4 | 96.7 | 1.2 | 1.7 | 26.6 | 480 | 66 | 125 |
| Example 24 | 47 | 2.6 | 96.8 | 1.0 | 1.6 | 27.1 | 465 | 67 | 127 |
| Example 25 | 46 | 2.5 | 96.8 | 0.9 | 1.6 | 26.9 | 470 | 68 | 128 |
| Example 26 | 44 | 2.5 | 97.0 | 1.0 | 1.6 | 27.4 | 475 | 71 | 132 |

As seen from Table 6, the rebound resilience and wear resistance are improved by modifying the active terminal of the unmodified polymer with the specified modifying agent as compared with those of the unmodified polymer.

EXAMPLE 27

Into an autoclave of 5 liter in capacity purged with nitrogen are charged 2.5 kg of cyclohexane and 300 g of 1,3-butadiene in a nitrogen atmosphere.

Into the resulting mixture is charged a catalyst obtained by previously mixing a cyclohexane solution containing neodymium versatate ($Nd(VCH)_3$, 0.09 mmol), a solution of methylaluminoxane (MAO, 2.7 mmol) in toluene, a solution of di-isobutylaluminum hydride ($AliBu_2H$, 5.2 mmol) in hexane and a solution of trimethylchlorosilane ($Me_3SiCl$, 0.18 mmol) in hexane and aging them with an amount of 1,3-butadiene corresponding to 5 times of neodymium amount at 25° C. for 30 minutes to conduct polymerization at 80° C. for 1 hour.

Then, the resulting unmodified polymer solution is added with a solution of dioctyltin bisoctylmaleate (DOTBOM, 3.6 mmol) as a modifying agent in cyclohexane while maintaining the temperature at 80° C. and thereafter left to stand for 30 minutes with stirring and then added with a methanol solution containing 1.5 g of 2,4-di-t-butyl-p-cresol to stop polymerization, which is desolvated by steam stripping and dried on a roll at 110° C. to obtain a modified polymer.

The properties of this polymer and properties of a vulcanizate using this polymer are measured to obtain results as shown in Table 7.

EXAMPLE 28

A polymer is obtained in the same manner as in Example 27 except that dimethyldichlorosilane ($Me_2SiCl_2$, 0.09 mmol) is used instead of $Me_3SiCl$. The properties of this polymer and properties of a vulcanizate using the same are measured to obtain results as shown in Table 7.

EXAMPLE 29

A polymer is obtained in the same manner as in Example 27 except that methyldichlorosilane ($MeSiHCl_2$, 0.09 mmol) is used instead of $Me_3SiCl$. The properties of this polymer and properties of a vulcanizate using the same are measured to obtain results as shown in Table 7.

EXAMPLE 30

A polymer is obtained in the same manneer as in Example 27 except that diethyldichlorosilane ($Et_2SiCl_2$, 0.09 mmol) is used instead of $Me_3SiCl$. The properties of this polymer and properties of a vulcanizate using the same are measured to obtain results as shown in Table 7.

EXAMPLE 31

A polymer is obtained in the same manner as in Example 27 except that methyltrichlorosilane ($MeSiCl_3$, 0.06 mmol) is used instead of $Me_3SiCl$. The properties of this polymer and properties of a vulcanizate using the same are measured to obtain results as shown in Table 7.

EXAMPLE 32

A polymer is obtained in the same manner as in Example 27 except that ethyltrichlorosilane ($EtSiCl_3$, 0.06 mmol) is used instead of $Me_3SiCl$ and the amount of DOTBOM is 1.8 mmol. The properties of this polymer and properties of a vulcanizate using the same are measured to obtain results as shown in Table 7.

EXAMPLE 33

A polymer is obtained in the same manner as in Example 27 except that trichlorosilane ($HSiCl_3$, 0.06 mmol) is used instead of $Me_3SiCl$ and the amount of DOTBOM is 1.8 mmol. The properties of this polymer and properties of a vulcanizate using the same are measured to obtain results as shown in Table 7.

EXAMPLE 34

A polymer is obtained in the same manner as in Example 27 except that dichlorotetramethyl disilane ($ClMe_2SiSiMe_2Cl$, 0.09 mmol) is used instead of $Me_3SiCl$. The properties of this polymer and properties of a vulcanizate using the same are measured to obtain results as shown in Table 7.

EXAMPLE 35

A polymer is obtained in the same manner as in Example 27 except that dichlorotetrametyl disiloxane ($ClMe_2SiOSiMe_2Cl$, 0.09 mmol) is used instead of $Me_3SiCl$ and the amount of DOTBOM is 5.4 mmol. The properties of this polymer and properties of a vulcanizate using the same are measured to obtain results as shown in Table 7.

TABLE 7

(a)

| | Catalyst component (mmol) | | | | | Polymer yield (g) |
|---|---|---|---|---|---|---|
| | Rare earth element compound | Aluminoxane | Organoaluminum compound | Silicon compound | Modifying agent (mmol) | |
| Example 27 | Nd(VCH)$_3$ (0.09) | MAO (2.7) | AliBu$_2$H (5.2) | Me$_3$SiCl (0.18) | DOTBOM (3.6) | 290 |
| Example 28 | Nd(VCH)$_3$ (0.09) | MAO (2.7) | AliBu$_2$H (5.2) | Me$_2$SiCl$_2$ (0.09) | DOTBOM (3.6) | 295 |
| Example 29 | Nd(VCH)$_3$ (0.09) | MAO (2.7) | AliBu$_2$H (5.2) | MeSiHCl$_2$ (0.09) | DOTBOM (3.6) | 295 |
| Example 30 | Nd(VCH)$_3$ (0.09) | MAO (2.7) | AliBu$_2$H (5.2) | Et$_2$SiCl$_2$ (0.09) | DOTBOM (3.6) | 295 |
| Example 31 | Nd(VCH)$_3$ (0.09) | MAO (2.7) | AliBu$_2$H (5.2) | MeSiCl$_3$ (0.06) | DOTBOM (3.6) | 285 |
| Example 32 | Nd(VCH)$_3$ (0.09) | MAO (2.7) | AliBu$_2$H (5.2) | EtSiCl$_3$ (0.06) | DOTBOM (1.8) | 285 |
| Example 33 | Nd(VCH)$_3$ (0.09) | MAO (2.7) | AliBu$_2$H (5.2) | HSiCl$_3$ (0.06) | DOTBOM (1.8) | 285 |
| Example 34 | Nd(VCH)$_3$ (0.09) | MAO (2.7) | AliBu$_2$H (5.2) | ClMe$_2$SiSiMe$_2$Cl (0.09) | DOTBOM (3.6) | 290 |
| Example 35 | Nd(VCH)$_3$ (0.09) | MAO (2.7) | AliBu$_2$H (5.2) | ClMe$_2$SiOSiMe$_2$Cl (0.09) | DOTBOM (5.4) | 290 |

(b)

| | Properties after the addition of modifying agent | | | | | | | | | | |
|---|---|---|---|---|---|---|---|---|---|---|---|
| | Mooney viscosity (ML$_{1+4}$, 100° C.) | | Mw/Mn | | cis-1,4- bond (%) | Vinyl-1,2- bond (%) | Cold flow (mg/min) | TB (MPa) | EB (%) | Properties of vulcanizate | |
| | | | | | | | | | | Rebound resilience (25° C., %) | Wear resistance (index) |
| | before modification | after modification | before modification | after modification | | | | | | | |
| Example 27 | 25 | 42 | 2.2 | 2.6 | 96.4 | 1.3 | 0.5 | 26.5 | 470 | 68 | 135 |
| Example 28 | 28 | 43 | 2.1 | 2.4 | 96.8 | 1.1 | 0.6 | 26.8 | 465 | 69 | 140 |
| Example 29 | 30 | 44 | 2.0 | 2.3 | 97.0 | 0.9 | 0.6 | 27.2 | 460 | 72 | 145 |
| Example 30 | 31 | 44 | 2.0 | 2.4 | 96.8 | 1.1 | 0.4 | 27.8 | 470 | 70 | 143 |
| Example 31 | 33 | 48 | 2.2 | 2.5 | 97.5 | 1.2 | 0.5 | 27.5 | 490 | 69 | 139 |
| Example 32 | 34 | 50 | 2.2 | 2.6 | 97.2 | 1.2 | 0.5 | 27.8 | 475 | 71 | 140 |
| Example 33 | 33 | 48 | 2.3 | 2.7 | 97.3 | 1.2 | 0.5 | 28.0 | 500 | 68 | 137 |
| Example 34 | 28 | 46 | 2.1 | 2.5 | 96.2 | 1.3 | 0.4 | 27.5 | 485 | 71 | 138 |
| Example 35 | 27 | 48 | 2.0 | 2.6 | 96.8 | 1.1 | 0.3 | 27.8 | 480 | 70 | 141 |

As mentioned above, the invention provides novel conjugated diene polymers obtained by polymerizing a conjugated diene compound with a catalyst of rare earth element compound and reacting the resulting polymer with at least one compound selected from the group consisting of a halogenated organometallic compound, a halogenated metal compound, an organometallic compound, a heterocumulene compound, a hetero three-membered-ring containing compound, a halogenated isocyano compound, a carboxylic acid, an acid halide, an ester compound, a carbonic ester compound, an acid anhydride and a metal salt of a carboxylic acid as a modifying agent. The thus obtained polymers maintain good wear resistance and mechanical porperties and improved cold flow and are excellent in the storage stability and processability. Therefore, the invention is suitable for the production of conjugated diene polymers.

What is claimed is:

1. A method of producing a conjugated diene polymer which comprises polymerizing a conjugated diene compound with a catalyst consisting essentially of the following components (a) to (d) in an organic hydrocarbon solvent; and then reacting with component (j) and, optionally, component (i):

Component (a): a compound containing a rare earth element of atomic number 57-71 in the Periodic Table or a compound obtained by reacting the compound with a Lewis base;

Component (b): a compound containing at least one halogen atom;

Component (c): an aluminoxane;

Component (d): an organoaluminum compound represented by the following general formula (1):

$$AlR^1R^2R^3 \qquad (1)$$

wherein $R^1$ and $R^2$ are the same or different and are a hydrocarbon group having a carbon number of 1-10 or a hydrogen atom, and $R^3$ is a hydrocarbon group having a carbon number of 1-10 provided that $R^3$ is the same as or different from $R^1$ or $R^2$;

Component (i): a carboxylic acid, an acid halide, an ester compound, a carboxylic ester compound or an acid anhydride represented by the following general formula (8), (9), (10), (11), (12) or (13):

$$R^7-(COOH)_m \qquad (8)$$

$$R^8-(COX)_m \qquad (9)$$

$$R^9—(COO—R^{10})  \quad (10)$$

$$R^{11}—OCOO—R^{12} \quad (11)$$

$$R^{13}—(COOC O—R^{14})_m \quad (12)$$

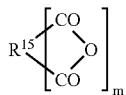
(13)

wherein $R^7$ to $R^{15}$ are the same or different and are a hydrocarbon group having a carbon number of 1-50, X is a halogen atom and m is an integer of 1-5; and Component (j): a component selected from the group consisting of dioctyltin dilaurate, dioctyltin bisoctylmaleate, dioctyltin bisbenzylmaleate, dioctyltin bisethylmaleate and bisoctyltin maleate, wherein the component (j) is used as a modifying agent.

2. The method according to claim 1, wherein the resulting polymer after the polymerization with the catalyst has a content of cis-1,4-bond of not less than 90% and a ratio of weight-average molecular weight to number-average molecular weight of not more than 3.5 as measured by a gel permeation chromatography.

3. The method according to claim 1, wherein the resulting final polymer has a content of cis-1,4-bond of not less than 90% and a ratio of weight-average molecular weight to number-average molecular weight of not more than 4 as measured by a gel permeation chromatography.

4. The method according to claim 1, wherein the component (a) is selected from the group consisting of a carboxylate, an alkoxide, a β-diketone complex, a phosphate and a phosphite of neodymium, praseodymium, cerium, lanthanum or gadolinium.

5. The method according to claim 1, wherein the component (b) is selected from a metal halide, an organometallic halide, an organic halide compound and a halogenated silicon compound.

6. The method according to claim 5, wherein said metal halide or organometallic halide is selected from diethylaluminum chloride, ethylaluminum sesquichloride, ethylaluminum dichloride, diethylaluminum bromide, ethylaluminum sesquibromide and ethylaluminum dibromide.

7. The method according to claim 5, wherein said organic halide compound is selected from benzoyl chloride, xylene dichloride, xylene dibromide, propyonyl chloride, benzyl chloride, benzylidene chloride, t-butyl chloride and the like, organic bromine compounds such as benzoyl bromide, propyonyl bromide, benzyl bromide, benzylidene bromide, t-butyl bromide and the like; methylchloroformate, methylbromoformate, chlorodiphenyl methane and chlorotriphenyl methane.

8. The method according to claim 5, wherein said halogenated silicon compound is selected from trimethylchlorosilane, methyldichlorosilane, diethyl dichlorosilane, methyl trichlorosilane, ethyl trichlorosilane, trichlorosilane, dichlorotetramethyl disilane, dichlorotetramethyl disiloxane and silicon tetrachloride.

9. The method according to claim 1, wherein the component (c) has a chemical structure of the following general formula (19) or (20):

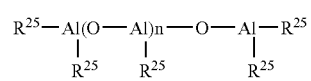 (19)

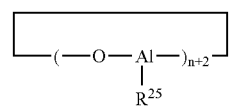 (20)

wherein $R^{25}$ is a hydrocarbon group having a carbon number of 1-20, and n is an integer of not less than 2.

10. The method according to claim 6, wherein the hydrocarbon group represented by $R^6$ in the formula (19) or (20) is methyl group, ethyl group, propyl group, n-butyl group, isobutyl group or t-butyl group.

11. The method according to claim 1, wherein the component (d) is selected from the group consisting of trimethylaluminum, triethylaluminum, tri-n-propylaluminum, tri-isopropylaluminum, tri-n-butylaluminum, tri-isobutylaluminum, tripentylaluminum, trihexylaluminum, tricyclohexylaluminum, trioctylaluminum, diethylaluminum hydride, di-n-propylaluminum hydride, di-n-butylaluminum hydride, di-isobutylaluminum hydride, ethylaluminum dihydride, n-propylaluminum dihydride and isobutylaluminum dihydride.

12. The method according to claim 1, wherein the component (a) is used in an amount of 0.0001-1.0 mmol per 100 g of the conjugated diene compound and the catalyst has such a composition ratio that a molar ratio of component (a) to component (b) is 1:0.1-1:15, a molar ratio of component (a) to component (c) is 1:1-1:5000, a molar ratio of component (a) to component (d) is 1:1-1:500 and a molar ratio of component (c) to component (d) is 1:0.02-1:300.

13. The method according to claim 1, wherein the conjugated diene compound is selected from the group consisting of 1,3-butadiene, isoprene, 2,3-dimethyl-1,3-butadiene, 1,3-pentadiene, 1,3-hexadiene and cyclo 1,3-hexadiene.

14. The method according to claim 1, wherein an amount of each of the components (e)-(j) used to the component (a) is 0.01-200 as a molar ratio.

* * * * *